Oct. 11, 1960 G. A. JENSEN ET AL 2,955,456
SHOCK TESTING MACHINE
Filed June 2, 1958 8 Sheets-Sheet 1

GERALD A. JENSEN
JOHN J. SZCZURKO
INVENTORS

BY Alden D Redfield
Abraham Ogman
ATTORNEYS

GERALD A. JENSEN
JOHN J. SZCZURKO
INVENTORS

ATTORNEYS

GERALD A. JENSEN
JOHN J. SZCZURKO
INVENTORS

GERALD A. JENSEN
JOHN J. SZCZURKO
INVENTORS

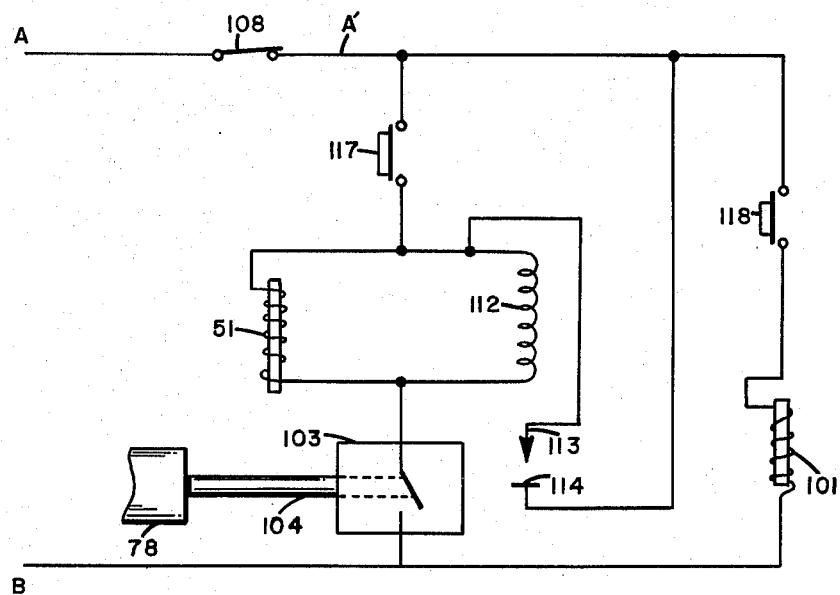

United States Patent Office 2,955,456
Patented Oct. 11, 1960

2,955,456

SHOCK TESTING MACHINE

Gerald A. Jensen, Tewksbury, and John J. Szczurko, Millbury, Mass., assignors to Avco Manufacturing Corporation, Cincinnati, Ohio, a corporation of Delaware Filed June 2, 1958, Ser. No. 739,261

22 Claims. (Cl. 73—12)

This invention relates to a shock testing machine and in particular to means for modifying the intrinsic shock pulse produced by the machine. For the purposes of this discussion the intrinsic shock pulse is defined as the pulse developed in a shock testing machine of conventional design and construction. The conventional machine is assumed to lack ancillary means which contribute to the shape of the shock pulse produced.

The conventional shock machine for determining the ability of a specimen to withtsand shock comprises a base including an anvil positioned therein, a movable carriage adapted to carry the test specimen and to be dropped on the anvil for producing a shock pulse, and a carriage support structure for supporting the carriage in a raised position and for guiding its fall to the anvil. In one form of shock testing machine, lead pellets are placed on the anvil to control the deceleration of the carriage for producing a specific form of shock pulse. The intrinsic shape of the shock pulse is determined by the shape of the lead pellet and the structural features of the machine. Heretofore, there was no known means for modifying the intrinsic shock pulse for modifying and improving the performance of the basic shock testing machine. In recognizing this limitation we suggest herein a means for modifying the intrinsic shock pulse to meet specific requirements.

The function of the shock machine is to decelerate the test specimen within a specified time and in a specific manner in order to determine its ability to stand up under anticipated shock conditions. One widely used shock testing machine is designed to produce a sawtooth shock pulse. Because of its asymmetrical shape the ideal sawtooth shock pulse is well suited for shock testing purposes. It can be made to develop shock spectra which are substantially flat over a wide frequency range, 100 to 2000 cycles, for example. Heretofore, the skilled practitioners have been plagued by their inability to construct a shock testing machine which could develop a substantially ideal sawtooth wave, i.e., one having a sharp terminal peak and zero decay time. In practice the terminal peak of the sawtooth shock pulse is rounded off. The rounded peak manifests itself in a fall off of certain shock spectra in the vicinity of 900 cycles per second, a condition which seriously limits the usefulness and efficiency of the machine, as will be shown hereinafter.

A further limitation of existing machines is their inability to prevent transient forces from being transmitted from the base to the carriage during the impact period when the carriage is being decelerated by the lead pellet positioned on the anvil.

It is an object of the invention to provide a shock testing machine which overcomes one or more of the limitations and disadvantages of prior shock testing machines.

It is another object of the invention to provide a shock testing machine which is capable of producing shock spectra which is substantially flat over a wide frequency range.

It is still another object of the invention to provide a shock testing machine having ancillary means for modifying the intrinsic shock pulse of the machine and improving the performance thereof.

It is still another object of the invention to provide a shock testing machine which produces a sawtooth deceleration pattern and includes means for sharpening the terminal peak of the sawtooth pattern thereby improving the shock spectra the machine is capable of producing.

It is yet another object of the invention to provide a shock testing means whose carriage is isolated from transient vibration forces induced in its supporting structure and in its base.

It is yet another object of the invention to provide a shock testing machine having a simplified mechanism for raising the carriage into a raised latched position.

Other objects of the present invention are to provide a shock testing machine including one or more of the following:

(1) A resonant mass system disposed in a cavity within the carriage for modifying the intrinsic shock pulse.

(2) An anvil connected to an actuating mechanism for raising and lowering the anvil for carrying the carriage to a raised latched position.

(3) Resilient bearing means interposed between the carriage and its support structure, and between the base and the support structure for preventing the translation of transient forces induced in the base and support structure to the carriage.

In accordance with the invention, a machine or apparatus for determining the ability of a specimen to withstand shock comprises in combination a base, including an anvil, and a movable carriage adapted to carry the test specimen and to be dropped on the anvil. The machine also includes guide means for constraining the carriage to move vertically with respect to the anvil. The guide means is suitably isolated from the base and the carriage for preventing transient forces from being passed, from the base and guide means into the carriage. The machine further includes shock controlling means disposed centrally on the anvil for controlling the deceleration of the carriage and subjecting the specimen to a predetermined shock pulse. Finally, the machine includes mass means disposed within the carriage and adapted to move relative thereto for modifying the shape of the shock pulse.

Also in accordance with the invention there is provided an actuating mechanism connected to the anvil for raising and lowering the anvil. The anvil in turn is adapted to raise the carriage into engagement with a latching mechanism at a predetermined raised position.

The novel features that we consider characteristic of our invention are set forth in the appended claims: the invention itself, however, both as to its organization and method of operation, together with additional objects and advantages thereof, will best be understood from the following description of a specific embodiment when read in conjunction with the accompanying drawings, in which:

Figs. 7A–7D include curves useful in describing the function and operation of the shock testing machine.

Figure 8A:
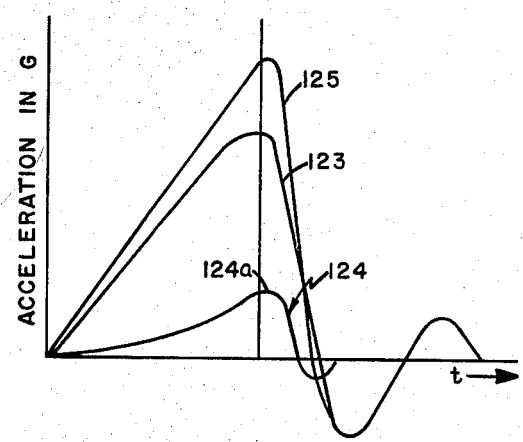
Figure 8B:
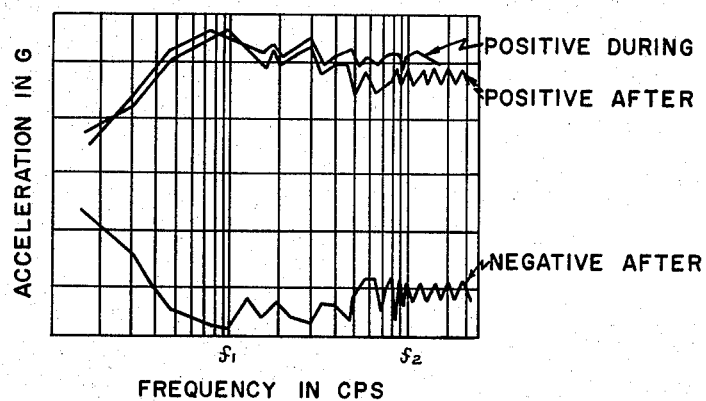

Figs. 8A and 8B include other curves useful in describing the operation of the shock testing machine.

Fig. 9 is a schematic representation of the control circuit of the shock testing machine.

*Description of the shock testing machine*

Figure 1:
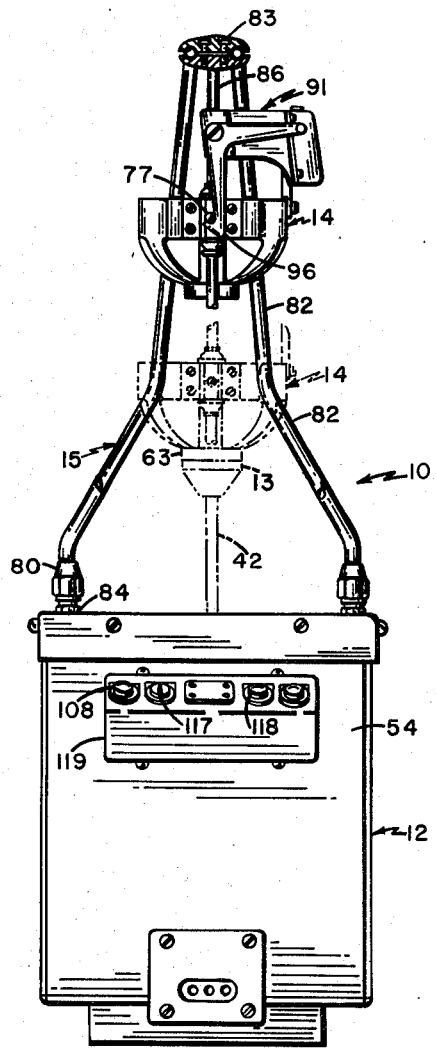
Fig. 1 is a front elevation view of a shock testing machine embodying the principles of the present invention.
Figure 2:
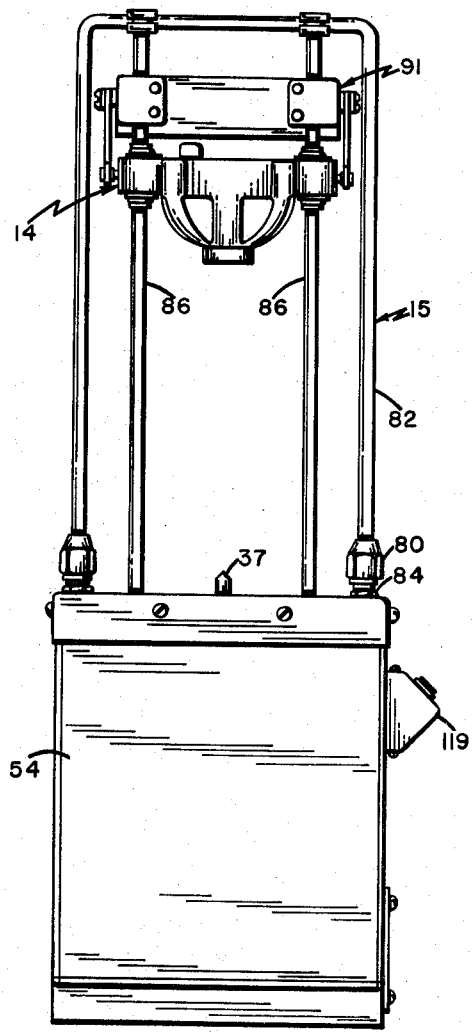
Fig. 2 is a side elevation view of the shock testing machine.
Figure 3:
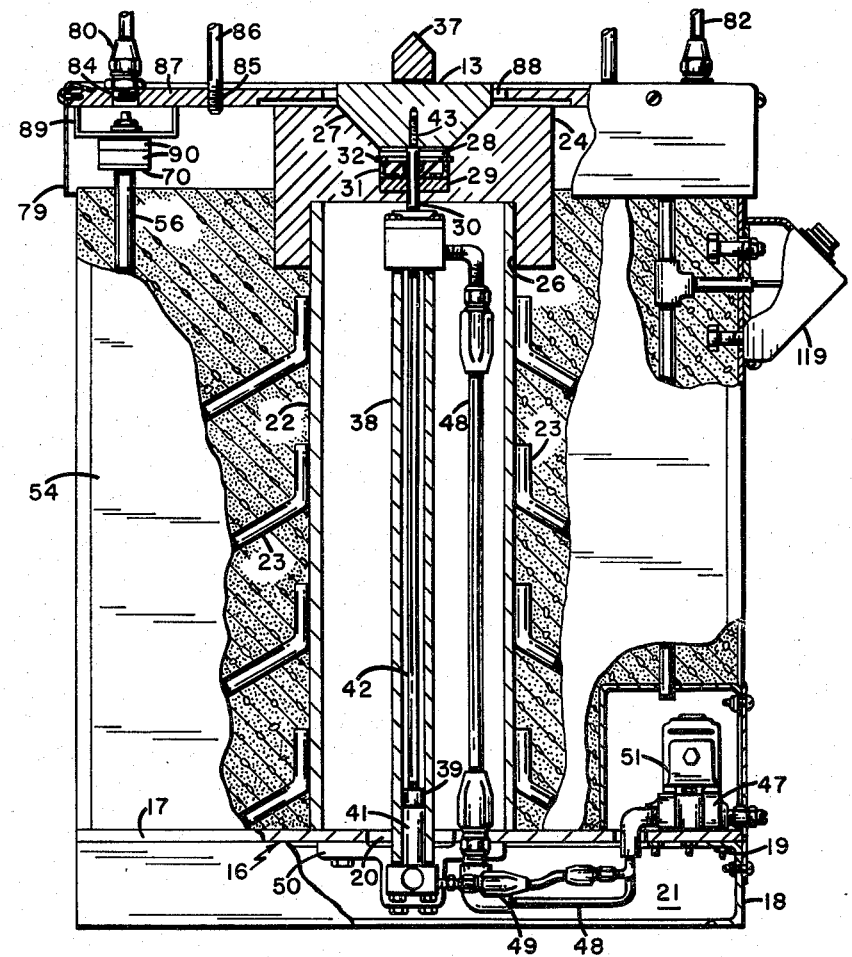
Fig. 3 is an enlarged side view, partially in section, showing the base of the shock testing machine.

Referring to Figs. 1–3 of the drawings there is represented a shock testing machine 10 constructed in accordance with the principles of the present invention. The shock testing machine includes a base 12, having an anvil 13, as well as a carriage 14 and a supporting framework 15 adapted to support and to guide the carriage 14. The carriage 14 is aligned vertically over the anvil 13 and is constrained to drop vertically by gravity to the anvil 13.

Shown in Fig. 3, partially in section, is base 12. The base 12 includes a metal frame, generally designated 16, comprising a horizontal plate 17 supported by four horizontally extending channels 18 secured to its under side as by bolts 19. The plate 17 and the channels 18 define a compartment 21. Centrally positioned on the plate 17 and extending from the upper surface thereof is a cylindrical tube 22. The bottom edge of tube 22 is secured by any suitable means, such as welding, to plate 17. Fastened to the outside surface of tube 22, in a plurality of equally spaced columns, are L-shaped tie rods 23, the function of which will be described hereinafter. The unsecured legs of tie rods 23 extend downwardly and outwardly from the surface of tube 22.

A cylindrical block 24 of metal overlies the upper end of tube 22. The lower portion of block 24 includes a cylindrical recess 26 in which the upper end of tube 22 is inserted. The upper portion of block 24 includes a recess 27 having inwardly tapering walls forming a truncated conical section. Extending down from the smaller end of the conical section is a cylindrical bore 28. A bronze bushing 29 is seated on the bottom wall of recess 28 and is maintained in position by an oil and dust seal 31 and a retaining ring 32. A passage 30 interconnects recess 26 with bore 28.

The base 12 also includes an anvil 13 which is adapted to receive and transmit the impact of the falling carriage. A portion of the surface of anvil 13 is tapered inwardly and conforms with the walls of recess 27 in block 24. Anvil 13 is normally seated in recess 27, and when struck by carriage 14, transmits the shock force through block 24 to tube 22 and from tube 22 throughout base 12, where it is absorbed. The manner in which the shock force is distributed in base 12 will be discussed hereinafter.

As is well known, to generate a sawtooth shock pulse, a conical topped pellet 37 is centrally positioned on anvil 13. Carriage 14 impacts on pellet 37 and its deceleration is controlled by the pellet to produce the sawtooth pulse. The mass of the pellet, its volume, and the angle of the conical portion are all a function of the machine parameters, and the type of pellets used, will vary from one type of machine to another. However, in all machines a properly chosen pellet produces an intrinsic shock pulse having the rounded terminal peak.

The shock testing machine 10 also includes an actuating mechanism comprising a double acting pneumatic motor 38, of conventional design and operation for raising and lowering anvil 13. The pneumatic motor 38 includes a piston 39 which is adapted to reciprocate within a cylinder 41 of motor 38. A rod 42 is attached to the upper surface of piston 39 and extends through the upper end of motor 38 through passage 30 in block 24 as well as through the bronze bushing 29 and the oil seal 31 respectively and is threaded, as at 43, into the body of anvil 13. The pneumatic actuating mechanism also includes a valve 47 and conduits, generally identified 48 and 49, to operate pneumatic motor 38. The valve 47 is controlled by a solenoid 51 attached to it, and acts in a conventional manner to supply air under pressure from a compressor (not shown) to one end of the cylinder 41, while exhausting the other end to the atmosphere.

Normally the upper portion of the cylinder 41 is connected through valve 47 to the compressor, to prevent the anvil 13 from chattering in its seat and inducing spurious vibrations in the carriage 14 when it is struck by the carriage. The lower end of pneumatic motor 38 extends downwardly through an aperture 20 in plate 17 into compartment 21, and is secured to plate 17 by means of a bracket 50, as shown in Fig. 3. The upper end of the pneumatic motor 38 is supported from transverse movement by piston rod 42 which is journaled through block 24 and the bronze bushing 29. While the pneumatic actuating mechanism is preferred, it is obvious that a hydraulic or mechanical mechanism may be used to raise and lower the anvil 13. That portion of the frame structure 16 in base 12 above plate 17 is imbedded in a block of concrete 54 substantially as shown in Fig. 3. Tie rods 23 extend into the concrete block 54 and transmit the shock force from tube 22 uniformly and at a low intensity throughout the concrete 54. The buildup of destructive localized stresses in the concrete 54 is thereby prevented.

Figure 6:
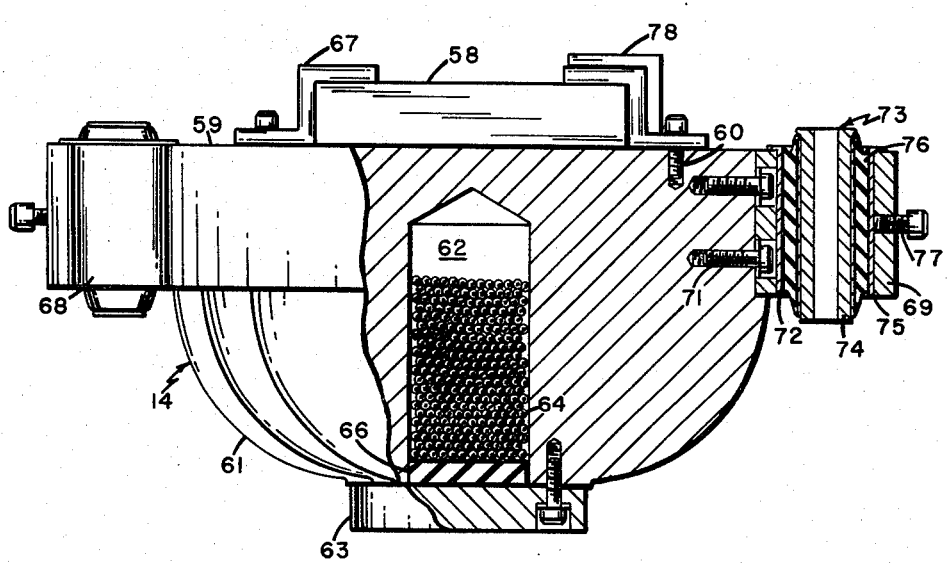
Fig. 6 is an enlarged side view, partially in section, showing the carriage.

Referring now to Fig. 6 there is represented, partially in section, carriage 14 upon which a test specimen 58 is secured. The carriage includes a body portion 59, an impact disc 63 and guide members 68. The body portion 59, comprises preferably an aluminum casting shaped substantially as shown in Fig. 6, includes on its lower side reinforcing ribs 61 which extend diagonally inwardly for imparting rigidity to the carriage 14, to prevent vibration forces from being developed within the carriage. Extending upwardly from the bottom surface of the body 59 is a cylindrical recess 62. Impact disc 63 covers the opening of recess 62 and defines a cavity within carriage 14 which is adapted to be partially filled by a mass 64, comprising preferably particles of lead shot. In the alternative a solid mass may replace lead shot without substantially affecting the function of the mass in the shock testing machine 10. Interposed between the mass 64 and the impact disc 63 is a resilient washer 66 made preferably of rubber.

The mass 64 while constrained within the recess 62 is movable relative to the body 59. The mass 64 in combination with the resilient washer 66 comprise a resonant system having a low resonant frequency. A plurality of tapped holes 60 in carriage 14 opening on the upper surface or face plate of body 59 are provided for fastening a test specimen 58 to the carriage 14 as indicated, for example, by the clamps 67.

Guide members 68 are provided on opposite sides of carriage 14 for guiding the vertical movements thereof. The guide members 68 are secured to the body portion 59 by means of a bracket 69 and bolts 71. The bracket 69 includes a bore 72 in which is positioned a bearing element 73. The bearing element 73 comprises an inner cylindrical sleeve 74 and an outer concentric sleeve 75. The inner and outer sleeves 74 and 75, respectively, are connected by means of a resilient sleeve 76 which is secured to the outer surface of sleeve 74 and the inner surface of sleeve 75 in any suitable manner, by gluing for example. Bearing element 73 is adapted to fit loosely within bore 72 of guide member 68. It is secured in place by means of a lock bolt 77 extending horizontally through bracket 69 and bearing against the outer surface of cylinder 75. Bolt 77 extends outwardly from bracket 69 in order to provide a cam follower means for maintaining the carriage in a raised position in a manner to be described hereinafter. Finally, the carriage 14 includes a rectangular finger 78 which extends vertically above the upper surface of carriage 14 and is used in controlling the movement thereof, as will be shown hereinafter.

The shock testing machine 10 also includes a carriage support structure 15 (Figs. 1 and 2) for supporting the carriage 14 in a raised position and for guiding its movement from the raised position to the anvil 13. The support structure 15 comprises a heavy plate 87, as seen in Fig. 3, preferably made of steel, overlying but spaced from the upper surface of base 12. The plate 87 is resiliently mounted to base 12. The mounting means comprises a bracket 89 secured to the underside of plate 87 and adapted to fit loosely over the threaded end of a stud 56 partially embedded in the concrete block 54, and extending upwardly therefrom. The stud 56 includes a collar 70, preferably forming an integral part thereof, situated below the threaded end of stud 56. Resilient bearing means 90, preferably made of rubber, is interposed between the collar 70 and the bracket 89 and provides a resilient bearing surface for plate 87, and consequently for the whole support structure 15. The resilient bearing members 90 prevent transient vibration forces, which are induced in the base 12, from the impact from being transmitted to the carriage 14 through the support structure 15. The anvil 13 extends through plate 87, for a short distance above the upper surface of plate 87, through an aperture 88 in plate 87 provided for this purpose. The marginal edges of aperture 88 are spaced from anvil 13, with considerable clearance, in order to prevent anvil 13 from contacting plate 87 at any time. A skirt 79 depends from the outer edges of plate 87 to generally impart an aesthetically desirable appearance to the machine 10.

Extending upwardly from plate 87 are a pair of generally U-shaped frames 82 (see Fig. 2). The frames 82 are bent laterally toward each other as represented in Fig. 1 and are connected in a spaced relationship at their upper ends by links 83. The lower extremities of frames 82 are secured to plate 87 in any suitable manner, for example by means of a fitting 80 threaded on a stud 84 provided in plate 87.

Depending vertically from link 83, from a point midway between frames 82 are a pair of opposing guide rods 86. The guide rods 86 are journaled through sleeve 74 on carriage 14 for guiding the free fall of the carriage 14. Recalling that sleeve 74 is connected to carriage 14 through the resilient sleeve 76, the carriage 14 is seen to be isolated from vibration forces induced in the guide rods 86. The lower end of rods 86 are threaded into complementary tapped holes 85 (Fig. 3) provided in plate 87 for that purpose.

Figure 4:
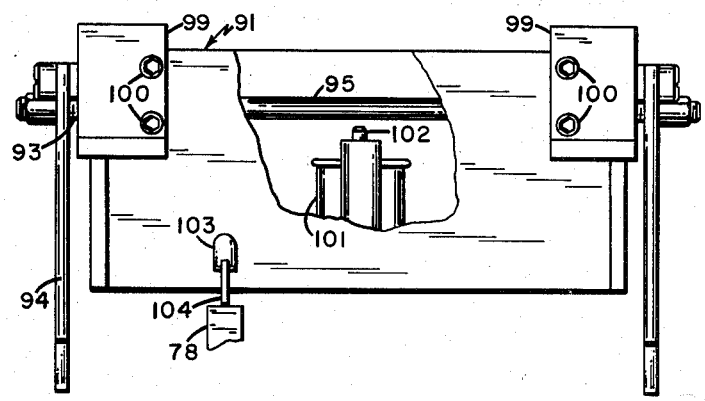
Fig. 4 is an enlarged front view of a latching mechanism, parts being broken away to show its interior construction.
Figure 5:
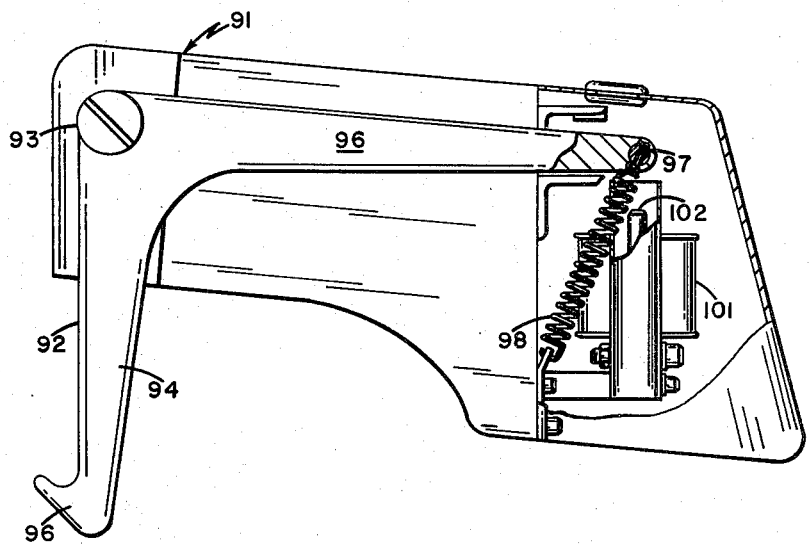
Fig. 5 is an enlarged side view of the latching mechanism, parts being broken away to show its release mechanism.

Adjustably secured to rods 86 is a latching mechanism 91 for maintaining the carriage 14 in a raised position and for releasing it, substantially instantaneously. The latching mechanism 91 is shown in detail in Figs. 4 and 5 and comprises a pair of opposing bell cranks 92 pivotally mounted thereto as at 93. The bell cranks 92 are interconnected by a rod 95 extending through the body of the latching mechanism 91, and include a depending leg 94 which terminates in a hook 96. The hook 96 is adapted to slide beneath the extended body of bolts 77 on carriage 14 for supporting carriage 14 in a raised position. The rod 95 is secured, as at 97 to a spring 98 which biases the bell cranks 92 and the hook 96 in a forward direction into the path of travel of bolts 77 for engaging the extended body thereof. The latching mechanism 91 also includes a pair of brackets 99 which are adjustably secured to guide rods 86 as by bolts 100 for varying the height from which the carriage 14 is to be dropped.

To release the carriage 14 from the raised position there is provided an electrically operated solenoid 101 having a normally retracted plunger 102. When solenoid 101 is activated, the plunger 102 is projected upwardly into contact with the rod 95. The force exerted by plunger 102 is sufficient to overcome the bias on bell cranks 92 and they are rotated counterclockwise in the direction of the arrow shown in Fig. 5, thereby removing hooks 96 from beneath bolts 77. Its support being removed, carriage 14 drops by gravity to the anvil 13. The latching mechanism 91 also includes a microswitch 103 having a plunger 104 which is positioned in the path of movement of the finger 78 extending from carriage 14. The plunger 104 is depressed by finger 78 when the carriage 14 is in the raised position.

In Fig. 9 of the drawings there is shown a schematic representation of a circuit for controlling the operation of the shock testing machine 10. Electric power is supplied to the machine 10 on conductors A, B. The application of electric power to the control circuit is controlled by an "on-off" switch 108. When switch 108 is closed conductor A is connected directly to conductor A' thereby furnishing electric power to the control circuit. Connected in series across the power lines A'B are a momentary operated push button switch 118 and the release solenoid 101. Solenoid 101, it will be recalled, is located in the latching mechanism 91 and serves to release carriage 14 when energized. Also connected across power lines A'B are momentary push button switch 117 and the microswitch 103 in series with the parallel combination of solenoid 51 and a coil 111 of relay 112. Solenoid 51 is connected to the hydraulic valve 47 for directing the application of air to the pneumatic motor 38. Relay 112 and its associated contacts 113 and 114 provide a holding circuit for maintaining solenoid 51 energized after push button switch 117 has been momentarily actuated and released. Contacts 113 and 114 are in parallel with push button switch 117 and by-pass switch 118 when closed. As shown in Fig. 9 the contacts are open when plunger 104 is depressed by finger 78 of carriage 14. It will be noted that relay 112 and solenoid 51 may be energized only when push button 117 and microswitch 103 are closed. Relay 112 and switches 108, 117 and 118 are located in a control panel 119 mounted to one side of base 12 as indicated in Figs. 1–3.

*Operation*

The operation of the shock testing machine 10 will be described in conjunction with the control circuit diagram in Fig. 9 and by considering a typical cycle performed by the machine. At the start of the cycle the carriage 14 is assumed to be in a raised position in engagement with the latching mechanism 91. Finger 78 on carriage 14 has depressed plunger 104 on microswitch 103 opening the contacts therein. Solenoid 51 is therefore de-energized and anvil 13 is seated. A pellet 37 is positioned on anvil 13.

To perform a test on the test specimen 58, the operator presses the push button switch 118 to energize solenoid 101. The plunger 102 of solenoid 101 is projected upwards and rotates bell crank 92 in a counterclockwise direction disengaging the hoods 96 from bolt 77. The carriage 14 drops vertically to the anvil 13, crushing the pellet 37.

The impact of the carriage 14 on pellet 37 causes the carriage to decelerate linearly, developing a sawtooth deceleration pattern. During the impact of the carriage 14 on the lead pellet 37, there is induced within the test specimen 58 an acceleration shock pulse substantially identical in form to the deceleration pattern of the carriage 14.

With carriage 14 on the anvil the contacts in microswitch 103 are closed, and to raise carriage 14 the push button switch 117 is momentarily pressed energizing solenoid 51 and relay 112. Valve 47 responds to the activation of solenoid 51 to connect the lower portion of the cylinder 41 of the pneumatic motor 38 to the compressor while connecting the upper portion of cylinder 41 to the atmosphere. Consequently, the piston 39 is forced upward carrying the rod 42, the anvil 13 attached to the rod 42, and the carriage 14 now supported on anvil 13. The holding circuit established by contacts 113 and 114 when relay 112 was energized, keeps valve 47 energized and continues the upward movement of the anvil 13 and the carriage 14. The dotted outline in Fig. 1 shows the carriage 14, being raised to its elevated position by anvil 13. As the carriage 14 is raised, the bolts 77 thereon engage hooks 96 on the latching mechanism 91 and momentarily move them aside. As the upward movement continues the bolts 77 move past the hooks 96 and the latter return to their normal position under the bolts 77.

Near the end of its travel the finger 78 engages and subsequently depresses plunger 104 on microswitch 103, opening the contacts therein. The energizing circuit for solenoid 51 is, thereby, interrupted and the valve 47 is returned to its normal position. The pressure differential within cylinder 41 is reversed by the valve 47. Pressure is now applied to the upper portion of cylinder 41 and the lower portion is exhausted to the atmosphere and the anvil 13 is returned to its seat, and maintained there under pressure in the manner heretofore described. The carriage 14 upon losing the support of the anvil 13 drops a short distance and comes to rest supported by hooks 96. A new pellet 37 is positioned on anvil 13 and the machine is prepared to repeat the foregoing operation.

Before discussing the performance and function of the mass 64 carried within carriage 14, the shape of the shock pulse and its effect on a test specimen will be described. Referring to Figs. 7A–7D there are represented therein a series of curves which are useful in describing the performance of the shock machine 10.

The effectiveness of a shock testing machine is determined by the shock spectrum developed by the machine. The shock spectrum is defined as the envelope of the peak acceleration response to a shock pulse attained by a plurality of resonant members, usually resonant beams, plotted as a function of the resonant frequency of the beams. A typical shock response to a sawtooth shock pulse of a resonant beam is shown in curve 122 in Fig. 7B. The excitation of the beam by the sawtooth shock pulse is represented by the linear portion 122a. The beam is set into motion by the applied shock pulse and starts to vibrate sinusoidally at its resonant frequency. Its response, therefore, is represented by the sinusoidal variation in acceleration 122b created by the vibrations. Of interest to the practitioner are the amplitudes of acceleration reached during the first vibration cycle. These amplitudes are widely known as the "positive during," which represents the maximum acceleration of the applied shock pulse, the "negative after," which represents the magnitude of acceleration reached by the beam during its first reversal, and "positive after" which represents the magnitude of acceleration reached by the beam at the completion of the first acceleration cycle.

Figure 7A:
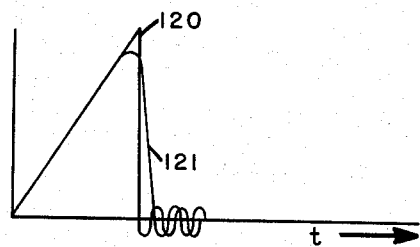
Figure 7B:
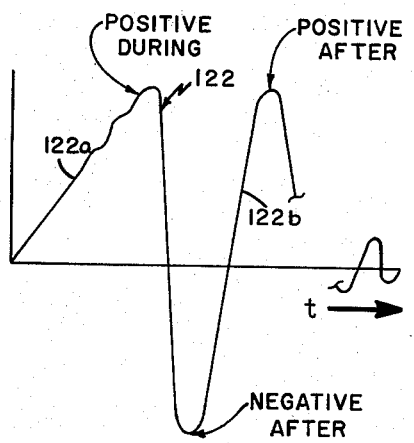
Figure 7C:
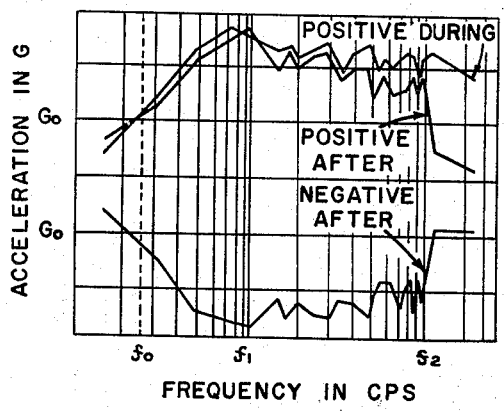
Figure 7D:
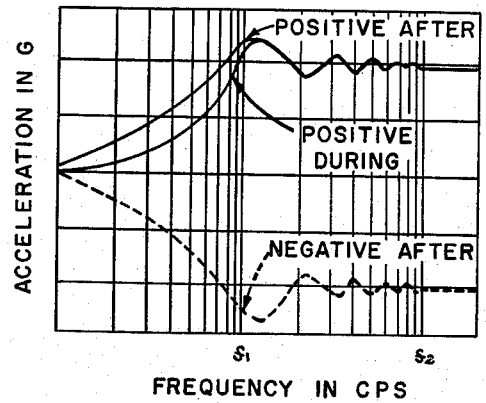

The curve 120 in Fig. 7A represents an ideal sawtooth shock pulse having a sharp terminal peak and substantially zero decay time. Curve 121 in the same figure represents an intrinsic sawtooth shock pulse obtained on a conventional shock testing machine and it will be noted that it is imperfect, the terminal peak is round and there is a finite decay time. The shock spectra developed by the application of an ideal sawtooth shock pulse, 120 for example, is represented in Fig. 7C of the drawings. On the other hand, the shock spectra developed by the imperfect sawtooth shock pulse, curve 121 is represented in Fig. 7D. It will be noted in comparing Figs. 7C and 7D that the shock spectra developed under ideal conditions is substantially flat from the frequency $f_1$ to $f_2$, and beyond. Theoretically the spectra should be flat out to infinity. In the imperfect case (7D) the "positive after" and "negative after" spectra fall off sharply above the frequency $f_2$. Clearly, resonant elements having resonant frequencies above $f_2$ are not subjected to a complete acceleration cycle at the maximum magnitude of acceleration developed by the applied shock pulse. It is well known that the "after" spectra are more important than the "during" spectrum, because the acceleration cycle, from the "positive during" through the "negative after" and finally through the "positive after" introduces a measure of fatigue stress to the test specimen over and above the tensile stress introduced by the shock acceleration. Accordingly a marginal specimen which will not rupture, or exhibit its weakness when initially stressed by the shock pulse, will invariably fail under the added fatigue stress created by the reversal in acceleration which occurs during the first cycle.

In testing many specimens and in particular electronic equipment a test specimen may include a plurality of elements, transformers, tubes, subassemblies for example, which resonate at different frequencies. By subjecting the test specimen to an ideal sawtooth acceleration shock pulse, it is possible to determine the ability of all the elements contained therein, including those that resonate above $f_2$, to withstand shock in a single operation of the machine. The elements within the test specimen pass through one cycle of acceleration at the full magnitude developed by the applied shock pulse. Clearly, referring to Fig. 7D, this has not been possible in conventional shock testing machines because the imperfect intrinsic sawtooth shock (curve 121) developed therein is responsible for the fall off in the "after" spectra at $f_2$. Elements resonating above the frequency $f_2$ are subjected to a minimum acceleration during the "negative after" and "positive after" periods. In conventional machines this limitation is overcome by subjecting the test specimen to a second imperfect sawtooth shock pulse whose duration is substantially smaller than is conventionally used. A short duration shock pulse has the effect of moving the shock spectra to the right thereby causing the frequency at which the "after" spectra tends to fall off to be increased. In practice to perform a complete test on conventional machines required twice the number of operations that would be necessary through the use of the present invention.

The mass 64 in combination with the resilient washer 66 provides a simple means for overcoming the limitations of conventional shock machines. Its function will be described with reference to Fig. 8. Curve 123 represents the imperfect sawtooth shock pulse developed using conventional techniques and includes a rounded terminal peak. Curve 124 represents a shock response of the mass 64 in combination with the resilient washer 66 acting as a resonant system having a low resonant frequency, $f_0$ for example. The amplitude of curve 124 is determined by the resonant frequency of the mass 64 and washer 66 combination. Referring to curve 7D, it is seen that at frequency $f_0$ the maximum acceleration induced in a resonant element resonanting at a frequency $f_0$ equals $G_0$. Referring once again to curve 124 it will be seen that it is not periodic in nature, as in the case of the previously described resonant beams, but tends to fall off or be damped after the first half cycle. This condition is brought about in the following manner. In trying to reverse itself the shot in the mass 64 collide with each other and in so doing do work and dissipate the energy induced therein very quickly. Also, since the resilient washer 66 is a non linear element, the mass does not reach its maximum acceleration following a linear path but follows the substantially logarithmic path 124a.

The applied shock pulse developed by the shock machine 10 with the ancillary mass 64 therein is a composite pulse, curve 125, formed by combining the intrinsic shock pulse of the carriage 14 as represented in curve 123 with the shock response of the mass 64, as represented in curve 124. It will be noted that due to the non linear nature of curve 124 the acceleration ordinate increases rapidly in the region in which the acceleration ordinate of curve 123 begins to fall off. In effect there is produced an applied shock pulse whose terminal peak in sharper, whose decay time is shorter, and thus tends to approach the ideal form.

In Fig. 8B there is shown the shock spectra obtained by a shock testing machine having a carriage modified in accordance with the teachings of the present invention and containing a low frequency resonant system of the form heretofore described. It will be noted that the shock spectra is substantially flat beyond the frequency $f_2$ thereby making it possible to test elements within a test specimen having a wide range of resonant frequencies with a single impact.

With a .006 second sawtooth shock pulse $f_1$ and $f_2$ were found to be 100 cycles per second and 1000 cycles per second respectively. We found that a slight sharpening of the terminal peak by a mass 64 weighing from five to ten percent of the combined weight of the carriage 14 and the test specimen 58, resulted in a substantial improvement in the shock spectra. With the carriage modified in accordance with the teachings of the present invention the "after" spectra were found to be flat to at least 2000 cycles per second. Accordingly, the useful range of the shock testing machine 10 is at least double that of conventional machines.

It was previously mentioned that a solid mass can be used in place of the lead shot. The solid mass is not preferred because it lacks the internal damping action of the lead shot and the solid mass will continue to vibrate after the applied shock pulse has terminated. These later vibrations may be neglected however, because the effect of the small solid mass on the combined weight of the carriage 14 and the test specimen 58, after they have come to rest is small.

In the event the anvil is resiliently mounted the applied shock pulse becomes generally sinusoidal. It is well known that the spectra produced by a sinusoidal shock pulse includes frequencies at which no acceleration shock pulse is induced in a specimen. An ancillary mass, fashioned after mass 64, included in the carriage of the shock machine may be used to modify the spectra. In this connection it is possible to shift the frequencies at which no acceleration shock pulse is provided to a higher or lower frequency value.

While the applicant does not intend to limit the invention to any particular design constant, the following values are representative of a particular construction of the Fig. 1 shock machine, it being understood that the exact values shown are dependent on a set of assumed operating characteristics.

*Shock machine specifications*

Base:
    Width 24 in. Depth 24 in. Height 30 in.
    Weight 2000 lbs.
Carriage:
    Weight 55 lbs. Cavity diameter 2½ in. Depth 5 in.
    Drop height 0–24 in.
    Ancillary mass. 5 lbs., #8 lead shot, to 20 c.p.s.
    Resilient washer diameter 2½ in. Thickness ⅜ in.
    Material rubber
Pellet:
    Diameter ⅞ in. overall height 11/16 in. conical angle 20°
Typical sawtooth shock pulse characteristics:
    Duration .006 sec.
    Maximum acceleration 100 G's.
    During and after spectra—substantially flat from 100 c.p.s. to at least 2000 c.p.s.

The application of the principles of the invention described herein may assume other forms. For example the resonant system comprising mass 64 and the resilient washer 66 may be mounted in the exterior of an existing conventional carriage to modify its performance to provide an improved sawtooth pulse. In addition, the resonant mass system may be incorporated on shock machines in which the carriage is hurled on a horizontal support structure to the anvil by power means. Also, if we arbitrarily consider the member carrying the test specimen, the carriage, there are machines in which the carriage is fixed in position and struck by a movable anvil. In this case the test specimen is initially accelerated. A resonant mass system may be used on the movable anvil to modify the intrinsic shock pulse.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. An apparatus for determining the ability of a specimen to withstand shock comprising in combination, a base including an anvil, a movable carriage adapted to carry the specimen and to be dropped on said anvil, said carriage comprising a body portion having a vertically extending cylindrical recess centrally defined therein and an impact disc covering the opening of the recess and secured to said body portion, the recess and said disc defining a closed cavity within said carriage, shock controlling means disposed centrally on said anvil for controlling the deceleration of said carriage and subjecting the specimen to an imperfect terminal peak sawtooth shock pulse, and mass means disposed within the cavity and adapted to move relative to said carriage for improving the shape of said sawtooth shock pulse.

2. An apparatus for determining the ability of a specimen to withstand shock comprising in combination, a base, a movable carriage adapted to carry the specimen and to be dropped on said base, said carriage having a cavity defined therein, means for controlling the deceleration of said carriage and subjecting the speciment to an imperfect terminal peak sawtooth shock pulse, and mass means disposed within said cavity and adapted to move relative to said carriage for improving the shape of said sawtooth shock pulse.

3. An apparatus as defined in claim 2 in which said mass means comprises a weighted member and a resilient member interposed between said weighted member and the bottom wall of the cavity.

4. An apparatus as defined in claim 2 in which said mass means comprises a low frequency resonant mass system.

5. An apparatus as defined in claim 2 in which said mass means comprises weighted particles partially filling said cavity and a rubber disc interposed between the weighted particles and the bottom wall of the cavity.

6. An apparatus for determining the ability of a specimen to withstand shock comprising in combination, a base, a movable carriage adapted to carry the specimen and to be dropped on said base, means for controlling the deceleration of said carriage and subjecting the specimen to a shock pulse, and mass means disposed within said carriage and adapted to move relative thereto for modifying the shape of said shock pulse.

7. An apparatus for determining the ability of a specimen to withstand shock comprising in combination, a base, a movable carriage adapted to carry the specimen and to be dropped on said base, means for controlling the deceleration of said carriage and subjecting the specimen to an intrinsic shock pulse, and means mounted to said carriage including mass means adapted to move relative to said carriage for modifying the shape of said intrinsic shock pulse.

8. In an apparatus for subjecting a specimen to an acceleration shock pulse, having a decelerating means, and a supporting structure, a movable carriage operatively connected to the supporting structure and adapted to be raised to a predetermined position and then dropped on the decelerating means, said carriage comprising; a body portion having a cavity defined therein, means for securing the specimen to said body portion, and mass means, disposed within the cavity and adapted to move relative thereto for modifying the shape of said shock pulse.

9. A carriage as defined in claim 8 in which said mass means comprises, a mass partially filling the cavity and adapted to move relative to the body portion, and a resilient member interposed between said mass and the bottom wall of the cavity.

10. In an apparatus for subjecting a specimen to an acceleration shock pulse, having a decelerating means and a supporting structure, a movable carriage operatively connected to said supporting structure and adapted to be raised to a predetermined position and then dropped on the decelerating means, said carriage comprising; a body portion, means for securing the specimen to said body portion, and a low frequency resonant system operatively connected to said body portion for modifying the shape of the shock pulse.

11. In an apparatus for determining the ability of a specimen to withstand shock, having a decelerating means, and a supporting structure, a movable carriage operatively connected to said supporting structure and adapted to be raised to a predetermined position and then dropped on the decelerating means for developing a shock pulse, said carriage comprising; a body portion having a recess defined therein, a disc secured to said body portion and covering the opening of the recess, said disc and the recess defining a closed cavity within said body portion, mass means contained in the cavity and adapted to move relative to said body portion, and a resilient member interposed between the mass and said disc.

12. In an apparatus for determining the ability of a specimen to withstand shock, having a decelerating means, and a supporting structure, a movable carriage operatively connected to said supporting structure and adapted to be raised to a predetermined position and then dropped on the decelerating means for developing a shock pulse, said carriage comprising; a body portion having a cylindrical recess defined therein, the recess being parallel with the drop path of said carriage, a disc secured to the body portion and covering the opening of the recess, said disc and recess defining a closed cavity within said body portion, a mass comprising weighted particles contained in the cavity and adapted to move relative to said body portion, and a resilient member comprising a rubber disc disposed in the opening of the recess between the mass and said impact disc.

13. In an apparatus for determining the ability of a specimen to withstand shock, having a base, a supporting structure, and a movable carriage operatively connected to the supporting structure and adapted to be raised to a predetermined position and then dropped on the base; an anvil for receiving the impact of the carriage, said anvil being normally seated in the base but adapted to be raised and lowered for carrying the carriage into the predetermined raised position, fluid means for raising and lowering said anvil, and an actuating means for said fluid means.

14. An apparatus as defined in claim 13 in which said fluid means comprises a pneumatic mechanism including a pneumatic motor, a valve in communication with the motor, and said actuating means comprises control means operatively connected to the valve for controlling the motor.

15. An apparatus as defined in claim 14 in which said valve is electrically controlled and said control means being adapted to raise and lower said anvil when momentarily actuated.

16. In an apparatus for determining the ability of a specimen to withstand shock, having a base, a supporting structure, a movable carriage operatively connected to the supporting structure and adapted to be raised to a predetermined position and then dropped on the base; an anvil for receiving the impact of the carriage, said anvil being normally seated in the base and adapted to be raised and lowered for carrying the carriage into the predetermined position, and a pneumatic actuating means operatively connected to the anvil for raising and lowering said anvil, and for maintaining said anvil in its normally seated position when it is struck by the carriage.

17. An apparatus for determining the ability of a specimen to withstand shock comprising in combination, an immovable member, a movable member adapted to be impacted on said immovable member, the specimen being secured to one of said members, means for controlling the deceleration of said movable member and subjecting the specimen to a shock pulse, and means mounted to said movable member including mass means adapted to move relative to said movable member for impacting against said movable member for modifying the shape of the shock pulse.

18. In an apparatus for subjecting a specimen to an acceleration shock pulse, having a decelerating means, and a supporting structure, a movable carriage operatively connected to the supporting structure and adapted to be impacted on the decelerating means comprising; a body portion, means for securing the specimen to said body portion, and means mounted to said body portion including mass means adapted to move relative to said body portion for impacting against said body portion for modifying the shape of the shock pulse.

19. A carriage as defined in claim 18 in which said mass means comprises a resonant mass system adapted to move relative to the body portion for modifying the shape of said shock pulse.

20. An apparatus for determining the ability of a specimen to withstand shock comprising in combination a first member, a second member adapted to be impacting on said first member, the specimen being secured to one of said members, means for controlling the deceleration of said second member for subjecting the specimen to a shock pulse, and mass means disposed within said second member and adapted to move relative thereto for modifying the shape of the shock pulse.

21. In an apparatus for determining the ability of a specimen to withstand shock comprising in combination, an immovable member, a movable member adapted to be impacted on said immovable member, the specimen being secured to one of said members, means for controlling the deceleration of said movable member for subjecting the specimen to an intrinsic shock pulse, and means mounted to said movable member including mass means adapted to move relative to said movable member for developing a second shock pulse, the intrinsic and second shock pulses co-acting on the specimen.

22. In an apparatus as described in claim 21, the intrinsic shock pulse being a terminal peak sawtooth, and the second shock pulse rising logarithmically to a peak magnitude substantially in time coincidence with the terminal peak of the intrinsic shock pulse.

References Cited in the file of this patent

UNITED STATES PATENTS

| | | |
|---|---|---|
| 2,645,931 | Johnson | July 21, 1953 |
| 2,656,711 | Tschudi | Oct. 27, 1953 |
| 2,762,661 | Sloyan | Sept. 11, 1956 |
| 2,846,869 | Tyler et al. | Aug. 12, 1958 |

OTHER REFERENCES

Publication: Journal Acoustical Soc. of America, v. 28, No. 5 (September 1956), pages 959–965, "Sawtooth Shock as a Component Test," by Morrow et al.